United States Patent Office 2,940,994
Patented June 14, 1960

2,940,994

PURIFICATION OF SULFONATION REACTION MIXTURES

James T. Gragson, Bartlesville, Okla., assignor to Phillips Petroleum Company, a corporation of Delaware No Drawing. Filed June 30, 1958, Ser. No. 745,318

3 Claims. (Cl. 260—504)

This invention relates to the purification of sulfonation reaction mixtures. In one aspect the invention involves the extraction of excess sulfuric acid resulting from sulfonation of petroleum oils using dimethylsulfoxide as the solvent. In another aspect the invention relates to the recovery of the removed sulfuric acid from the solvent as ammonium sulfate.

In the sulfonation of petroleum oil fractions with oleum, an excess of sulfuric acid remains which must be removed from the desired sulfonates. Conventional separation methods remove an acid sludge as a separate phase from the rest of the reaction mixture containing petroleum sulfonic acids. However, a significant proportion of the sulfuric acid remains in admixture with the desired petroleum sulfonates; also, the acid sludge must either be discarded or refined by complicated procedures before returning to the sulfonation reaction. The present invention simplifies the purification of the conventional relatively low molecular weight petroleum oil sulfonate reaction mixtures; moreover, the invention is particularly useful in the purification of sulfonation reaction mixtures resulting from sulfonation of relatively heavy or high molecular weight, highly refined oils, since the conventional practice is not applicable at all in the purification of sulfonates of such oils prepared with oleum as the sulfonating agent because there is no separation of a separate acid sludge phase. Its removal therefore presents a particular problem.

An object of this invention is to provide a method for separating sulfuric acid from the sulfonation reaction mixture of petroleum oils. Another object of the invention is to provide for the recovery of the removed sulfuric acid in the form of a valuable product. Other objects, as well as aspects and advantages, of the invention will be apparent from a study of the accompanying disclosure.

According to the invention, there is provided a process wherein the reaction mixture resulting from the sulfonation of a petroleum oil is extracted with dimethyl sulfoxide, the sulfuric acid removed from the dimethyl sulfoxide, and the dimethyl sulfoxide is recycled to the extraction step.

In accordance with the invention, the sulfuric acid can be removed from the dimethyl sulfoxide by any suitable means; however, in a particular aspect the invention further involves recovering the sulfuric acid contained in the extract by neutralizing with ammonia to form precipitated ammonium sulfate, and separating the ammonium sulfate. The dimethyl sulfoxide is then treated, as by blowing with an inert gas, to remove any excess ammonia contained therein; it is then ready for reuse in the extraction step. This aspect of the invention is particularly advantageous since the resulting ammonium sulfate is a valuable product, particularly for fertilizer uses.

The ammonium sulfate recovered by the foregoing procedure is usually impure, brown ammonium sulfate and, as such, finds a valuable market in the fertilizer industry. It can also be upgraded by decolorization by any suitable means. One such means involves dissolving the ammonium sulfate in water and treating with activated charcoal. After the decolorization treatment and removal of the charcoal evaporation of the solution yields a white ammonium sulfate.

After the extraction of the sulfonation reaction mixture the dimethyl sulfoxide to remove the sulfuric acid, the remaining reaction mixture, containing both neutral oils and petroleum sulfonic acids, can be used as such without any further treatment, or it can be treated in any suitable manner. One advantageous method of treatment comprises adding an excess of calcium hydroxide to convert the sulfonic acids to petroleum calcium sulfonates, evaporating water from the resulting mixture and then removing any small amount of calcium sulfate formed and any remaining calcium hydroxide such as, for instance, by filtration. This product can be used as such, for instance, as a lubricating oil additive, or the sulfonate can be concentrated by removal of unreacted oil, as by solvent extraction with a polar organic solvent such as methyl isobutyl ketone and alcohol, or a non-polar solvent such as a liquefied normally gaseous hydrocarbon, for example, propane and butane.

The process of the invention is advantageous since it avoids the problem of disposal of large amounts of calcium sulfate. It has also been noted that filtration rates are increased. Further, it is possible to recover nearly all of the sulfuric acid in the form of a valuable product, rather than in the form of the valueless calcium sulfate.

When effecting the extraction step using dimethylsulfoxide, it is often advantageous and convenient to dilute the reaction mixture with a hydrocarbon or other inert solvent of low viscosity, such as a $C_3$ to $C_8$ normal paraffin, for example, propane, n-butane, isobutane, the pentanes, hexanes, heptanes and octanes. The usual diluents are the butanes, pentanes, and hexanes.

The extraction step can be carried out at any suitable temperature and any pressure at which the solvent is in the liquid state. Room temperature and atmospheric pressure are quite suitable and are therefore usually employed. When a hydrocarbon diluent which is volatile is employed, a somewhat elevated pressure is required in order to keep the diluent in the liquefied state. The conditions of extraction with the dimethyl sulfoxide (DMSO) vary somewhat with the particular sulfonation reaction mixture extracted. However, these conditions are usually a solvent to acid weight ratio of from 0.8 to 1 to an upper value of 10 to 1, the upper limit being chosen mainly in view of economic considerations, higher ratios being effective. In actual practice this ratio usually does not exceed 3 to 1. Temperatures usually do not exceed 125° F.

The invention can be practiced with oils of SAE 5W and heavier. It is especially useful applied to the sulfonation reaction mixtures of solvent refined, dewaxed and deasphalted lubricating oils having a Saybolt Universal Viscosity of at least 140 seconds at 210° F. since such mixtures do not separate into two well defined liquid phases.

*Example I*

Twenty-five grams of dewaxed, solvent refined, lubricating oil of 203 SUS at 210° F. was sulfonated with six ml. of twenty percent fuming sulfuric acid. The sulfonation was carried out at about 100° F. for one hour. At the end of this time a small sample was titrated with standard base, and the amount of acid as sulfuric acid in the total mixture was determined to be 8.85 grams. To the acid-oil reaction mixture was added 102 grams of dimethyl sulfoxide (DMSO) with thorough mixing, and allowed to settle. An extract of 71.2 grams was recovered which contained 5.1 grams of sulfuric acid. After the first separation, 31 grams of fresh dimethyl sulfoxide was added, mixed well and allowed to settle. Thirty-one grams of the lower extract phase was recovered which contained 1.2 grams of sulfuric acid. A third extraction was made with 33 grams of dimethyl sulfoxide. Upon centrifuging, 42 grams of extract containing 0.9 gram of sulfuric acid was recovered. Two volumes of pentane were then mixed with the oil phase and allowed to stand overnight. An additional 21 grams of extract containing 0.5 gram of sulfuric acid was removed.

The amount of acid as sulfuric acid removed in the extraction was 7.7 grams or about 88 percent based on the acidity of the acid-oil reaction mixture prior to extraction with dimethyl sulfoxide. The amount of dimethyl sulfoxide remaining in the oil phase was about 8 grams or 4.8 percent of the total amount used.

No emulsion difficulties were encountered, and the two phases separated readily.

*Example II*

50 grams of Kansas City SAE 250 stock was sulfonated with 10.5 ml. of 20 percent fuming $H_2SO_4$ at 130° F. for 30 minutes. A one gram sample was titrated with standard base and showed 32.3 percent calculated as $H_2SO_4$.

25 grams of the reaction mixture was diluted with 100 ml. pentane and 100 grams of dimethyl sulfoxide (DMSO) added and mixed well then settled for 30 minutes. The bottom DMSO layer was separated and amounted to 101 grams. 50 grams of fresh DMSO added, mixed and settled. The second DMSO extract amounted to 40 grams. The extracts were combined and a one gram sample titrated. The acidity of the extract was 5.64 percent (wt.) calculated as $H_2SO_4$. From this the calculated amount of $H_2SO_4$ removed by DMSO was 7.95 grams. The acidity of the oil phase (111 grams) calculated as $H_2SO_4$ was reduced to 0.52 percent which is equivalent to 0.58 gram of $H_2SO_4$. This indicates that practically all of the $H_2SO_4$ was removed by DMSO. (The acidity of the sulfonic acids in the oil phase account for about 0.5 gram of the 0.58 gram.) The DMSO extract was neutralized by passing in anhydrous $NH_3$ until basic. The ammonium sulfate was removed by filtration. However, the salts were decolorized by dissolving in water and treating with activated charcoal. After decolorizing the filtrate was evaporated to give 10 grams of white crystalline material.

The DMSO was blown several minutes with natural gas to remove excess $NH_3$ and was used to extract a second portion of the sulfonation reaction mixture. Another 25 grams of the acid-oil reaction mixture (from same batch as that used in first extraction) was diluted with 100 ml. pentane and 50 grams of DMSO added mixed and settled. The DMSO layer was separated, another 50 grams of DMSO added mixed and settled and withdrawn. 50 grams of fresh DMSO was then added mixed and settled. The DMSO extracts were combined (133 grams) and a sample titrated and showed 5.05 percent acid calculated as $H_2SO_4$. This meant that a total of 6.72 grams of $H_2SO_4$ was extracted. The oil phase amounted to 140 grams and had 0.61 percent acid as $H_2SO_4$ or 0.85 gram.

The DMSO extract was neutralized with $NH_3$ and filtered. The precipitated salt was dark colored and it was decolorized by dissolving in water and treating with activated carbon.

It will be noted that the method of removal of the sulfuric acid from the dimethyl sulfoxide by neutralizing with ammonia, removing the resulting ammonium sulfate, and blowing to remove free ammonia, results in a dimethyl sulfoxide ready for reuse without further purification, since the reaction of sulfuric acid with ammonia does not result in the formation of any water. If care is taken to employ only a small excess of ammonia in this neutralization the dimethyl sulfoxide can be employed without the use of the blowing step to remove ammonia, since a small amount of ammonia in the dimethyl sulfoxide will not be objectionable in most cases.

*Example III*

The following test run, conducted on a synthetic mixture of dimethyl sulfoxide and sulfuric acid illustrates the excellent recovery of ammonium sulfate which can be obtained from the solvent by neutralizing with ammonia. 4.0 grams of concentrated $H_2SO_4$ was mixed well with 50 grams DMSO and a stream of anhydrous $NH_3$ passed in until slightly basic. A precipitate began to form almost immediately. After neutralization the material was filtered on a suction filter and the precipitate washed once on the filter with isopropyl alcohol. The precipitate was removed and dried at 160° F. for two hours. Weight=5.0 grams. This compares to 5.17 grams theoretical from 4.0 grams of 96 percent $H_2SO_4$. The precipitate was very white and needed no further purification.

As will be evident to those skilled in the art, various modifications of this invention can be made or followed in the light of the foregoing disclosure and discussion without departing from the spirit or scope of the disclosure or from the scope of the claims.

I claim:

1. In a process which comprises sulfonating a solvent refined lubricating petroleum oil with oleum, the step of extracting excess sulfuric acid from the sulfonation reaction mixture with dimethyl sulfoxide as solvent at a temperature not in excess of 125° F., employing a ratio of dimethyl sulfoxide to sulfuric acid of from 0.8:1 to 10:1.

2. In a process which comprises sulfonating a solvent refined lubricating petroleum oil with oleum, the steps of extracting excess sulfuric acid from the sulfonation reaction mixture with dimethyl sulfoxide as solvent at a temperature not in excess of 125° F., employing a ratio of dimethyl sulfoxide to sulfuric acid of from 0.8:1 to 10:1, neutralizing the acidity of the resulting extract with ammonia to form solid ammonium sulfate, separating the ammonium sulfate from the solvent, and returning the neutralized dimethyl sulfoxide to the extraction step.

3. In a process which comprises sulfonating a solvent refined lubricating petroleum oil with oleum, the steps of reducing the viscosity of the reaction mixture by diluting it with an inert hydrocarbon solvent, and thereafter extracting excess sulfuric acid from the diluted sulfonation reaction mixture with dimethyl sulfoxide as solvent at a temperature not in excess of 125° F., employing a ratio of dimethyl sulfoxide to sulfuric acid of from 0.8:1 to 10:1.

References Cited in the file of this patent

UNITED STATES PATENTS

| | | |
|---|---|---|
| 2,760,970 | Le Sueur | Aug. 28, 1956 |
| 2,365,898 | Morris et al. | Dec. 26, 1944 |